United States Patent
Rune et al.

(10) Patent No.: US 6,901,057 B2
(45) Date of Patent: May 31, 2005

(54) INTELLIGENT PICONET FORMING

(75) Inventors: Johan Rune, Lidingö (SE); Per X Johansson, Hägersten (SE); Christian Gehrmann, Lund (SE); Johan Sörensen, Eslöv (SE); Tony Larsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 674 days.

(21) Appl. No.: 09/729,926

(22) Filed: Feb. 27, 2001

(65) Prior Publication Data

US 2001/0029166 A1 Oct. 11, 2001

(30) Foreign Application Priority Data

Dec. 6, 1999 (EP) .............................................. 99850193

(51) Int. Cl.$^7$ ................................................. H04B 7/00
(52) U.S. Cl. ........................ 370/310; 370/349; 370/338
(58) Field of Search ................................ 370/310, 338, 370/349, 352–356, 402, 401, 432, 389, 390, 294, 386, 393, 469, 475, 465; 375/132, 133, 134; 455/41.2, 464, 434, 419, 418, 417

(56) References Cited

U.S. PATENT DOCUMENTS

| 5,818,828 | A | | 10/1998 | Packer et al. |
| 6,339,706 | B1 | * | 1/2002 | Tillgren et al. ............. 455/419 |
| 6,590,928 | B1 | * | 7/2003 | Haartsen ..................... 375/134 |
| 6,640,268 | B1 | * | 10/2003 | Kumar ......................... 710/46 |
| 6,697,638 | B1 | * | 2/2004 | Larsson et al. .......... 455/553.1 |

FOREIGN PATENT DOCUMENTS

| WO | 98/09213 A1 | 3/1998 |
| WO | 99/14898 | 3/1999 |
| WO | 99/37106 | 7/1999 |
| WO | 00/21075 A1 | 4/2000 |
| WO | 00/46959 A1 | 8/2000 |

OTHER PUBLICATIONS

"Digianswer Announces World's First Commercial Bluetooth Products", Digianswer A/S Pressroom, (online), retrieved from the Internet on 6-26-200, Oct. 9, 1999, pp. 1–4.

Kardach, "Bluetooth Architecture Overview", Internet (Online), retrieved from the Internet on Jun. 26, 2000, 1998, pp. 1–45.

Bluetooth Specification Version 1.0 B, Nov. 29, 1999, editor Jaaphaartsen, Baseband Specification, pp. 95–126.

* cited by examiner

*Primary Examiner*—Ajit Patel
(74) *Attorney, Agent, or Firm*—Nixon & Vanderhye, P.C.

(57) ABSTRACT

When connecting a unit to one or more existing ad hoc wireless networks comprising several units, the units e.g. adapted to communicate according to the Bluetooth specification and the network then being formed according to the same specification to comprise one or more piconets, a unit can discover the units which are the masters in the networks, and then connect as a slave to those masters. Specifically it does not have to use the master-slave switch according to the Bluetooth specification. In the first stage of the unit trying to make a connection it establishes contact with at least one unit in an existing ad hoc network and then additional information on the status, in particular the role of master or slave, of the unit already connected in the network is transferred to the not yet connected unit. This information facilitates the decision of the unconnected unit as to which unit in the network that it should try to correct to. Then, in the actual connecting of the unit to the network, the roles of the unit and of the already connected unit can be chosen by the unit wanting to be connected. In particular, the initially inquiring and paging unit may become a slave unit in a newly formed piconet or in an already existing piconet.

27 Claims, 3 Drawing Sheets

Suboptimal piconet and scatternet structure.

Optimal piconet structure.

INTELLIGENT PICONET FORMING

The present invention relates to forming ad hoc wireless networks, more particularly to ad hoc networks formed according to the Bluetooth specification, and connecting a unit to an already existing ad hoc network.

BACKGROUND

Bluetooth (BT) is a relatively new specification for wireless communication of data and voice based on a low-cost short-range radio link. It can be built into a 9×9 mm microchip, what facilitates ad hoc connections for both stationary and mobile communication environments. Information in this application is in part based on the Bluetooth specification, "Specification of the Bluetooth System", Jul. 26, 1999, the entirety of which is hereby incorporated by reference.

The original intention in making the specification of Bluetooth was to eliminate cables between telephones, PC-cards (Personal Computer cards), wireless headsets, etc., but today the Bluetooth specification is used for establishing true ad hoc wireless networks intended for both synchronous traffic, e.g. voice, and asynchronous traffic, e.g. data traffic based on the IP (the Internet Protocol). Now the intention of the Bluetooth specification comprises that any commodity device such as telephones, personal digital assistants (PDAs), laptop computers, digital cameras video monitors, printers, fax machines, etc. should be capable of communicating over a radio interface, i.e. any of these devices could contain a radio chip made according to the Bluetooth specification and having the software specified therefor.

In addition to merely replacing the cables between various devices, the use of the Bluetooth specification in various device provides a bridge to existing data networks and their peripheral devices, and a mechanism to form small private ad hoc groupings for connected devices away from fixed network structures or connected to a fixed network structure via a gateway. According to the Bluetooth specification the wireless communication uses a fast acknowledgement and frequency hopping scheme to make the radio links between devices adapted to communicate according to the Bluetooth specification robust. The devices avoid interference with one another by hopping to a new frequency or channel after transmitting or receiving a packet. Compared to other systems operating in the same frequency band, in the wireless communication according to the Bluetooth specification typically frequency hops are made faster and shorter packets are used. The radio band used by devices adapted to communicate according to the Bluetooth specification is the unlicensed 2.4 GHz Industrial-Scientific-Medical (ISM) band with a channel spacing of 1 MHz.

A device adapted to communicate according to the Bluetooth specification includes a radio unit, a link control unit and a support unit for link management and host terminal interface function. According to the specification a point-to-point connection can be provided in the case, where only two units adapted to communicate according to the Bluetooth specification are involved, or a point-to-multipoint connection in the case of more than two units. For a point-to-multipoint connection, the radio band is shared by several units adapted to communicate according to the Bluetooth specification. Two or more units adapted to communicate according to the Bluetooth specification form a small network called a piconet, see FIGS. 1a–1c. Within a piconet, a unit adapted to communicate according to the Bluetooth specification can have either of two roles: it can be a master or a slave. Within each piconet there may be only oral master and one slave, see FIG. 1a, or more than one up to seven active slaves, see FIG. 1b. Any unit adapted to communicate according to the Bluetooth specification can become a master in a piconet.

Furthermore, two or more piconets can be interconnected, form a composite network called a scatternet, see FIG. 1c. The connection point between two piconets consists of a unit C adapted to communicate according to the Bluetooth specification that is a member of both piconets. A unit adapted to communicate according to the Bluetooth specification can simultaneously be a slave member of multiple piconets, but only a master in one piconet, and thus a unit adapted to communicate according to the Bluetooth specification and acting as a master in one piconet can participate in other piconets only as a slave. A unit adapted to communicate according to the Bluetooth specification can only transmit and receive data in one piconet at a time, and therefore participation in multiple piconets is made on a time division multiplex basis.

The Bluetooth specification provides full-duplex transmission built on slotted Time Division Duplex (TDD), where each slot is 0.625 ms long. The time slots are numbered sequentially using a large number range, which is cyclic with a cycle length of 227. Master-to-slave transmission always starts in an even-numbered time slot while slave-to-master transmission always starts in an odd-numbered time slot. The combination of an even-numbered time slot and its subsequent odd-numbered time slot is called a frame, the frame thus including a master-to-slave time slot and a slave-to-master time slot, except in the case where multi-slot packets are used and longer frames are used. There is no direct transmission between slaves, neither within a piconet or between two different piconets.

The communication within a piconet is organised such that the master polls each slave according to some polling schedule. With one exception, a slave is only allowed to transmit after having been polled by the master. The slave will then start its transmission in the slave-to-master time slot immediately following the packet received from the master. The master may or may not include data in the packet used to poll a slave. The only exception to the above principle is that when a slave is connected by an established Synchronous Connection Oriented (SCO) link it is always allowed to transmit in the pre-allocated slave-to-master time slot, even if not explicitly polled by the master in the preceding master-to-slave time slot.

Each unit adapted to communicate according to the Bluetooth specification has a globally unique 48-bit IEEE 802 address. This address, called the Bluetooth unit Address (BD_ADDR), is assigned at the time when the unit is manufactured and it is never changed. In addition thereto the master of a piconet assigns a local Active Member Address (AM_ADDR) to each active slave member of the piconet. The AM_ADDR, which is only three bits long, is dynamically assigned and de-assigned and is unique only within a single piconet. The master uses the AM_ADDR when polling a slave in a piconet. However, when the slave, triggered by a packet from the master addressed using the AM_ADDR of the slave, transmits a packet to the master, it includes its own AM_ADDR and not the AM_ADDR of the master in the packet header since an AM_ADDR of the master does not exist. Thus, the master of a piconet never assigns an AM_ADDR to itself.

Although all data are transmitted in packets, the packets can carry both synchronous data, on the mentioned Synchronous Connection Oriented links, mainly intended for voice traffic, and asynchronous data, on AsynchronousConnectionLess (ACL) links. An SCO link is a symmetric point-to-point link between the master and a specific slave. The SCO link reserves slots and can therefore be considered as a circuit-switched connection between the master and the slave. An ACL link is a point-to-multipoint link between the master and all the slaves participating in the piconet. Slots may be reserved for SCO links, as indicated above, and in slots not reserved for such links the master can establish an ACL link on a per slot basis to any slave. The ACL link provides a packet-switched connection between the master and all active slaves participating in the piconet.

Depending on the type of packet used, an acknowledgement and retransmission scheme is used to ensure reliable transfer of data, such a scheme not being used for packets on SCO links transferring synchronous data. Forward error correction (FEC) in the form of channel coding is also used which limits the impact of random noise on long-distance links.

The standard format of a packet used for transmission according to the Bluetooth specification is illustrated in FIG. 2, this format not being used for some types of control packets. A standard packet has a field for an access code having the length of 72 bits and a header field of a length of 54 bits. There is a field for the payload which has a length that can range from zero to a maximum of 2745 bits. The AM_ADDR is located in the packet header followed by some control parameters, e.g. a bit indicating acknowledgement or retransmission request of the previous packet, when applicable, and a header error check (HEC).

The access code used in a packet can be one of three different types: Channel Access Code (CAC), Device Access Code (DAC), and Inquiry Access Code (IAC):

The Channel Access Code identifies a channel that is used in a certain piconet, i.e. essentially the CAC identifies the piconet. All packets exchanged within a piconet carry the same CAC. The CAC is derived from the BD_ADDR of the master unit of the piconet.

The Device Access Code is derived from a BD_ADDR of a particular unit adapted to communicate according to the Bluetooth specification. It is used for special signalling procedures, e.g. the PAGE procedure.

The Inquiry Access Code appears in two variants: the General Inquiry Access Code (GIAC) and the Dedicated Inquiry Access Code (DIAC). Both are used in the INQUIRY procedure, that will be explained in more detail below.

The format of the payload depends on the type of packet. The payload of an ACL packet consists of a header, a data field and, with the exception of AUX1 type packets, a cyclic redundancy check (CRC). The payload of a Synchronous Connection Oriented (SCO) packet consists of a single data field. In addition, there are hybrid packets including two data fields, one for synchronous data and one for asynchronous data. Packers in which the payload does not include a CRC are neither acknowledged nor retransmitted.

The protocol layers of a network formed by units adapted to communicate according to the Bluetooth specification are illustrated in FIG. 3. The Baseband, LMP and L2CAP represent existing Bluetooth specific protocols. The "High level protocol or application" layer represents protocols that may or may not be Bluetooth specific while the Network layer is not defined in the Bluetooth specification.

A limitation of the Bluetooth specification is that therein no method is explicitly provided to address and route packets from one piconet to another. Thus, inter-piconet communication performed in a scatternet is not specified, although there are proposals for how to achieve this.

An important capability in any ad hoc networking method is the neighbour discovery feature. Such a feature is also defined in the Bluetooth specification. Without a neighbour discovery capability, a unit adapted to communicate according to the Bluetooth specification would not be capable of finding any other units adapted to communicate according to the Bluetooth specification with which it could communicate and consequently no ad hoc network could be formed. The neighbour discovery procedure according to the Bluetooth specification consists of the INQUIRY message and the INQUIRY RESPONSE message. An "inquiry" procedure is defined which is used in applications where the device address of the destination is unknown to the source. For example, public facilities like printers or facsimile machines can be considered. Alternatively, the inquiry procedure can be used to discover other units adapted to communicate according to the Bluetooth specification which are located within the range of the transceiver of a considered unit adapted to communicate according to the Bluetooth specification.

A unit adapted to communicate according to the Bluetooth specification and wanting to discover neighbouring units also adapted to communicate according to the Bluetooth specification, neighbouring meaning within radio coverage of the first unit, will repeatedly transmit according to well specified timing and frequency sequences, INQUIRY messages and listen for INQUIRY RESPONSE messages, which are optional. An INQUIRY message consists of only an Inquiry Access Code (IAC). It does not contain any information about the source but may indicate the class of devices which should respond. The Inquiry Access Code can be a General Inquiry Access Code (GIAC), which is sent to discover any unit adapted to communicate according to the Bluetooth specification in the neighbourhood, or a Dedicated Inquiry Access Code (DIAC), which is sent to discover only a certain type of units adapted to communicate according to the Bluetooth specification, for which a particular DIAC is dedicated.

A unit adapted to communicate according to the Bluetooth specification receiving an INQUIRY message, including a GIAC or an appropriate DIAC, may respond by sending an INQUIRY RESPONSE message. The INQUIRY RESPONSE message is actually an Frequency Hop Synchronisation (FHS) packet, see FIG. 4. The FHS packet is a special control packet revealing, among other things, the transmitting unit and the clock of the transmitting unit. The payload field in such a packet includes eleven fields. All fields in the packet, except the AM_ADDR field, and of course the "Undefined" field, indicate properties or parameters of the unit that sends the FHS packet. The Lower Address Part (LAP), Upper Address Part (UAP) and Nonsignificant Address Part (NAP) fields together form the BD_ADDR. The "class of device" field indicates the class of device of the unit. The CLK field contains the current value of the internal clock of the unit. The SR, SP and "Page scan mode" fields all contain control parameters concerning the PAGE procedure. The contents of the AM_ADDR field can be used to assign an AM_ADDR to a unit which will become a slave in a piconet, and otherwise these three bits should all be set to zero. The "Undefined" field is reserved for future use and includes two bits, which should be set to zero. By listening for INQUIRY RESPONSE messages the unit that initiated the INQUIRY procedure can collect the BD_ADDR and internal clock values of the neighbouring units also adapted to communicate according to the Bluetooth specification.

An FHS packet is also used for other purposes according to the Bluetooth specification, in addition to the use as the INQUIRY RESPONSE message, e.g. for synchronising the frequency hop channel sequence, a paged master response and in the master-slave switch.

Related to the INQUIRY procedure is the PAGE procedure, which is used to establish an actual connection between two units adapted to communicate according to the Bluetooth specification. Once the BD_ADDR of a neighbouring unit is known to a unit, the paging unit, as a result of an INQUIRY procedure, the neighbouring unit can be paged by sending a PAGE message. Also the knowledge of the internal clock value of the unit to be paged will potentially speed up the PAGE procedure, since it makes it possible for the paging unit to estimate when and on which frequency hop channel the neighbouring unit will listen for PAGE messages.

A PAGE message consists of the Device Access Code (DAC), derived from the BD_ADDR of the paged unit. A unit adapted to communicate according to the Bluetooth specification and receiving a PAGE message including its own DAC responds by sending an identical packet, i.e. including only the DAC of the paged unit. The paging unit then replies by sending an FHS packet, including the BD_ADDR of the paging unit, the current value of the internal clock of the paging unit, the AM_ADDR assigned to the paged unit and some other parameters, see FIG. 4. The paged unit then responds once again by transmitting its DAC and thereby the connection between the two units is established.

If the paging unit already was the master of a piconet, the paged unit has now joined this piconet as a new slave unit. Otherwise, the two units have just formed a new piconet having the paging unit as the master unit. Since the INQUIRY message does not include any information on the sender thereof, in particular not its BD_ADDR, the unit that initiated the INQUIRY procedure is the only unit that can initiate a subsequent PAGE procedure. Thus, the unit initiating an INQUIRY procedure will also be the master of any new piconet that is formed as a result of a subsequent PAGE procedure. If considered necessary, however, the roles of master and slave can be switched using the master-slave-switch mechanism defined in the Bluetooth specification. This is a complex and extensive procedure resulting in a redefinition of the entire piconet, involving all other slave units in the piconet.

The INQUIRY and PAGE procedures are well specified in the Bluetooth specification. They are the only tools that are needed to form a new piconet or to join an existing one. Although the tools as such are well specified, there are no rules or guidelines as to how to use them. When neighbours are discovered there is no way of knowing to which thereof a connection should be made to in order to form an appropriate piconet. Even if the master-slave-switch mechanism exists, using it is an extensive procedure and it is difficult to know when to use it in order to improve the efficiency of piconet. Hence, piconets will be more or less established at random, often resulting in far from optimal piconet and scatternet structures.

An exception exists in the case where the unit wanting to establish a connection already knows the BD_ADDR of the unit to which it wants to connect. The use of the Dedicated Inquiry Access Code in the INQUIRY messages and the class of device field in the FHS packet, indicating the class of device of the unit that sends the FHS packet, can also be used to impose a certain control of the establishment of piconets. Nevertheless, units adapted to communicate according to the Bluetooth specification and forming a piconet or a scatternet generally result in less than optimal networks being formed.

The information exchanged during the INQUIRY and PAGE procedures is not sufficient to determine how to establish connections in order to form an efficient piconet. Furthermore, the fact that the unit that initiates an INQUIRY procedure will have to be the master of any new piconet that is formed as a result of a subsequent PAGE procedure makes the forming of piconets and scatternets inflexible. The complex and extensive master-slave-switch mechanism is too inefficient to compensate for this inflexibility.

Consider, for instance, a scenario in which a number of people have gathered in a conference room for a meeting. They turn on their laptops, which have circuits to communicate according to the Bluetooth specification and at random start to send INQUIRY messages and listen for INQUIRY messages from other units. Some other people may also later join the meeting resulting in more INQUIRY procedures. The result of these random INQUIRY procedures, followed by PAGE procedures and the forming of piconets, may well be something like the interconnected networks shown in FIG. 5, whereas an optimal piconet structure could be similar to the network shown in FIG. 6.

When a new unit moves into the neighbourhood of an existing piconet, e.g. as could be the case in this meeting scenario, it may want to communicate with the units connected to that piconet. The unit would then obviously like to join the piconet as a new slave unit. However, the means by which to achieve this as provided by the Bluetooth specification are few and inefficient. The unit would have to wait and hope to be discovered by the master unit of the piconet, by receiving an INQUIRY message from the master unit, and to be subsequently paged and connected. However, when receiving an INQUIRY message, it does not provide any information about the sender of the message. Therefore, an INQUIRY message received by the unit may also be transmitted by a slave unit, which is actually more likely, since there are usually more slave units than master units.

Waiting and hoping constitute no efficient method, but the Bluetooth specification allows an alternative way. The unit can itself send INQUIRY messages and hope to receive a response from the master unit of a piconet. However, the INQUIRY RESPONSE message, an FHS message, does not include any information on the fact whether the sender is a master or a slave of a piconet. Therefore, the unit has to take a chance and page and connect to a responding unit, hoping that the responding unit turns out to be the master of the piconet. If the unit is lucky, and actually manages to connect to the master unit of an existing piconet, a new piconet is formed having the inquiring and paging unit as the master unit and the paged master unit of the already existing piconet as a slave unit.

To join the old piconet the newly arrived unit has to request a master-slave switch. This master-slave switch will make the master unit of the old piconet, which is also a slave unit of the new piconet, a master also in the new piconet. Then, the two piconets will merge into one piconet making the new unit a slave unit in the merged piconet. Hence, joining an existing piconet as a slave unit requires first of all luck, and possibly also a master-slave switch.

SUMMARY OF THE INVENTION

The procedures for establishing piconets and scatternets and connecting new units to already existing piconets according to the Bluetooth specification would be facilitated and better piconet and scatternet topologies would be possible to achieve, if more information about the involved units could be exchanged before the piconets and scatternets are actually established and if the connection procedure could be made more flexible.

For this purpose procedures can be used for exchanging small, but valuable, pieces of information during the INQUIRY and PAGE procedures and a procedure can be used to increase the control of the forming of piconets and scatternets, based on the exchanged information.

The present invention relates to a method of forming ad hoc wireless networks, and more particularly, to forming wireless networks according to the Bluetooth specification and how a unit adapted to communicate according to the Bluetooth specification may best discover masters in existing piconets and be connected as a slave to those masters without having to use the master-slave switch.

An object of the present invention is to provide a method of more easily finding out the roles, master or slave, of units located in the neighbourhood of a considered unit, i.e. whether the neighbouring units are masters or slaves in already existing piconets.

Another object of the present invention is to allow the unit to connect to a master as a slave without using the complicated master-slave switching.

Generally, the method can be divided into two basic parts.

First, in the INQUIRY procedure, a few additional pieces of information are exchanged between two units adapted to communicate according to the Bluetooth specification. The additional information informs on the status of the responding unit in an existing piconet or existing piconets, what facilitates the decision of the unit, which sends the INQUIRY message, on which unit to attempt to be connected to. A similar improvement of the INQUIRY procedure can be achieved in an alternative way, by using a modified INQUIRY message. These two alternatives, which together constitute the first basic part of the method, are described in further detail below.

In the second basic part of the method, a procedure is provided by which the initial inquiring and paging unit can become a slave unit in a new formed piconet or in an already existing piconet. This new mechanism is used during the PAGE procedure and hence the use of the complex and extensive master-slave-switch mechanism is avoided, although there may be other situations in which the master-slave-switch mechanism is still needed. This second basic part of the method is also described in further detail below.

Some merits of the proposed method include providing means to impose an intelligent control of the forming of piconets in general. Efficient procedures are provided allowing a unit to join an existing piconet. In addition, the method allows exchange of piconet related information during the INQUIRY procedure and enhances the INQUIRY procedure so that the master units of existing piconets can be discovered. The second basic part of the method provides a procedure by which the initially inquiring and paging unit can become a slave unit in a now formed or previously existing piconet without going through the master-slave switch procedure. Furthermore, the method as proposed can be used to facilitate reforming scatternet structures.

The preferred procedures of the proposed method do not imply modifications of any of the existing message formats according to the Bluetooth specification although some of the alternative procedures require modifications of existing message formats.

Although the preferred embodiments of the proposed are directed to a system of units adapted to communicate according to the Bluetooth specification, the disclosed method is also applicable to general ad hoc networks which have features similar to those formed according to the Bluetooth specification. The proposed method provides means to impose an intelligent control of the forming of ad hoc networks in general and allows exchange of ad hoc network related information during a neighbour discovery procedure. A procedure is provided for the unit initiating the establishment of an ad hoc network to transfer the specific role of the initiator to another unit during the establishment phase.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

An ad hoc network contains a master or master unit and at least one slave or slave unit. Another unit capable of connecting to the ad hoc network can approach or become located in the neighbourhood of the network and then a procedure can be used for the other unit to discover the status of the units already connected in the ad hoc network. This procedure can be called a neighbour discovery procedure and in the procedure an exchange of information related to the network is made.

In the following description the units described are generally assumed to be units adapted to communicate according to the Bluetooth specification and also terminology according to the Bluetooth specification will be used, as has already been the case in the major part of the discussion given above. However, it will also be briefly described how the procedures described can be applied to other general methods of establishing ad hoc networks.

The neighbour discovery procedure allows a unit approaching an existing ad hoc network or piconet to discover whether a neighbouring unit is connected to the existing piconet and, in such a case, whether it is connected as a master or as a slave. In particular, the procedure allows the unit to discover a master in an existing piconet. Several alternative procedures will be described which can improve the procedures according to the Bluetooth specification.

Figure 1:
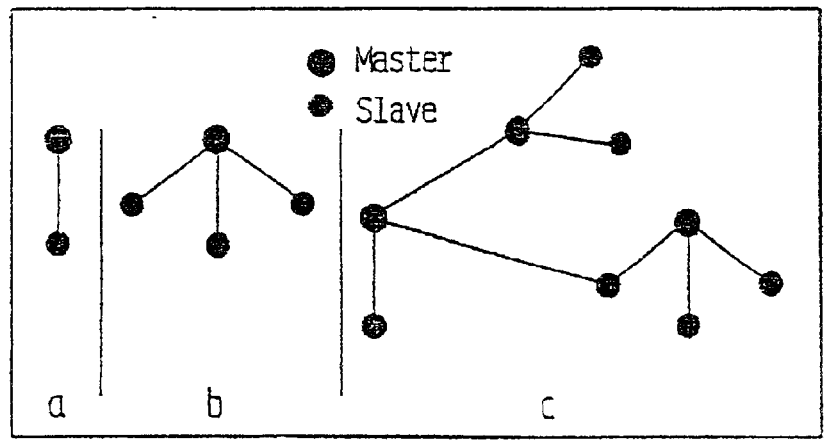
FIG. 1a–1c are diagrams of various master-slave relationships in a system of units adapted to communicate according to the Bluetooth specification.
Figure 2:
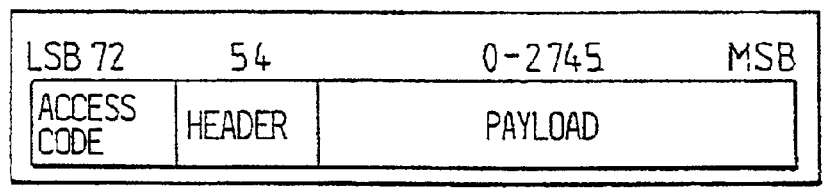
FIG. 2 is a picture illustrating the standard format of a packet according to the Bluetooth specification.
Figure 3:
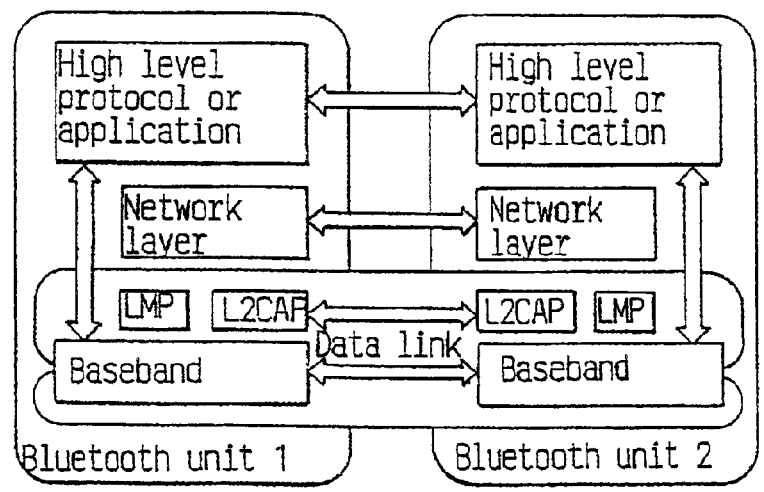
FIG. 3 is a diagram illustrating the protocol layers according to the Bluetooth specification.
Figure 4:
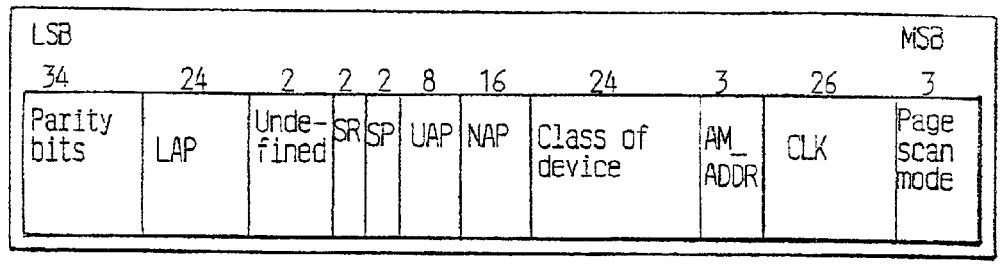
FIG. 4 is a picture illustrating the format of an FHS packet.
Figure 5:
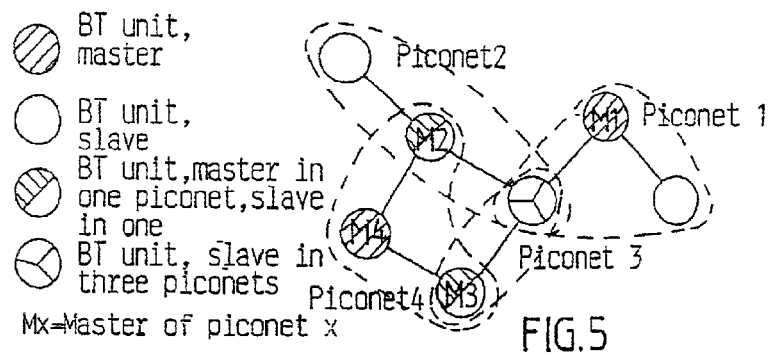
FIG. 5 is a diagram of a suboptimal piconet and scatternet structure.
Figure 6:
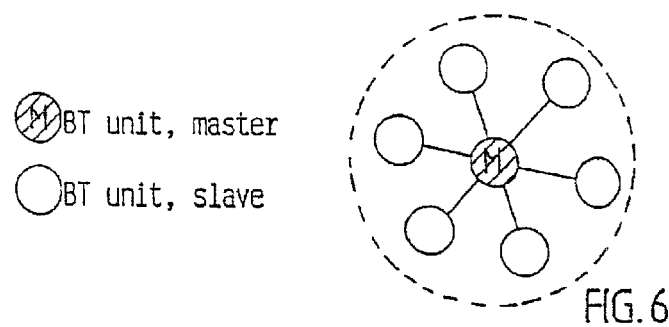
FIG. 6 is a diagram of an optimal piconet structure.

The FHS packet according to the Bluetooth specification, see the format thereof as illustrated in FIG. 4, which is used as a response message, the INQUIRY RESPONSE message, from a unit responding to an inquiry message, and in other procedures as well, includes some information about the unit sending the FHS packet, but no information on the piconet to which the unit may be connected to and on the status of the unit if connected in such a piconet. Including such information would give the inquiring unit some essential background knowledge to be used when the inquiring unit decides on which other units that it will attempt to be connected to.

A basic piece of information is whether the responding unit is a master of an existing piconet or not. A meeting scenario, as described in the general discussion above, illustrates the importance of this piece of information. This can be coded using one of the two undefined bits in the PHS packet, as shown in FIG. 4. Preferably, setting the selected bit to one would mean that the sending unit is the master of a piconet, while setting the bit to zero would mean that the sending unit is not the master of a piconet.

The information in the FHS packet which is related to an already formed piconet can be extended by using also the second of the two undefined bits. This can be used to indicate whether the sending unit is a slave unit in at least one piconet. Preferably, setting the bit to one would mean that the sending unit is a slave unit in one or more piconets, while setting the bit to zero would mean tat the sending unit is not a slave unit of any piconet at all.

The four possible combinations of the two bits are:

00 The sending unit is not connected to a piconet or the sending unit does not support this use of the "Undefined" field.
01 The sending unit is the master unit of a piconet.
10 The sending unit is a slave unit in one or more piconets.
11 The sending unit is the master unit of one piconet and a slave unit in one or more other piconets.

Observe that in the picture of FIG. 4, the right bit indicates the "master status" and do the left bit indicates the "slave status" of the sending unit.

Backwards compatibility with the Bluetooth specification is achieved by this solution, since the specification of the FHS packet states that the two undefined bits should be set to zero. This would indicate that the sending unit is not connected to any piconet.

An alternative way to include this information in the FHS packet is to use the class of device field, as seen in FIG. 4. The Bluetooth specification allows alternative coding of a part of the class of device field. A new coding could be used to include the above information, and possibly also other useful piconet and scatternet related information.

Yet another alternative way to include this information in the FHS packet is to use the AM_ADDR field. According to the Bluetooth specification of the FHS packet the tree bits of the AM_ADDR field should be set to zero in the case where the FHS packet is used as an INQUIRY RESPONSE message, since assigning an AM_ADDR is not applicable in that case.

Hence, these three bits are available to carry other information, e.g. piconet related information. By using the AM_ADDR field eight different states could be coded instead of the four states coded with the two undefined bits. It would also be possible to use both the undefined bits and the AM_ADDR field to code piconet related or other information, resulting in five bits corresponding to 32 possible states. In the following discussion it will be assumed that only the three bits of the AM_ADDR field is used for his purpose, while the two undefined bits are still undefined, unless explicitly stated otherwise. Two of the three bits in the AM_ADDR field could be used to code exactly the same information as suggested for the two undefined bits above. The third bit could be used to indicate whether the sending unit, when subsequently being paged, will want to connect to the paging unit as a slave unit or as a master unit using the modified PAGE procedure according to the procedure as described below.

A reason for not wanting to become a master unit when subsequently being paged may e.g. be that the considered approaching unit is already the master unit of a piconet having seven active slave units, giving no room for yet another active slave unit. Preferably, setting the third bit to one would indicate that the sending unit prefers to have the role of the master unit after a subsequent modified PAGE procedure, whereas setting the third bit to zero would indicate a preference for the slave role. This coding provides backwards compatibility with the Bluetooth specification, since according to the specification of the FHS packet the three bits of the AM_ADDR field should be set to zero when the FHS packet is used as an INQUIRY RESPONSE message. The following are the resulting possible combinations of the three bits of the AM_ADDR field:

000 The sending unit is not connected to a piconet and prefers to be a slave unit after a subsequent PAGE procedure or the sending unit does not support this use of the AM_ADDR field.
001 The sending unit is the master unit of a piconet and prefers to be a slave unit after a to subsequent PAGE procedure.
010 The sending unit is a slave unit in one or more piconets and prefers to be a slave unit after a subsequent PAGE procedure.
011 The sending unit is the master unit of one piconet and a slave unit in one or more other piconets and prefers to be a slave unit after a subsequent PAGE procedure.
100 The sending unit is not connected to a piconet and prefers to be a master unit after a subsequent modified PAGE procedure.
101 The sending unit is the master unit of a piconet and prefers to be a master unit after a subsequent modified PAGE procedure.
110 The sending unit is a slave unit in one or more piconets and prefers to be a master unit after a subsequent modified PAGE procedure.
111 The sending unit is the master unit of one piconet and a slave unit in one or more other piconets and prefers to be a master unit after a subsequent modified PAGE procedure.

In the format illustrated in FIG. 4 the right-most bit indicates the "master status", the middle bit indicates the "slave status", and the left-most bit indicates the "role preference" of the sending unit.

If the AM_ADDR field is used for coding piconet related information in combination with the above described use of the two undefined bits, the AM_ADDR field could e.g. be used to indicate the number of active slave units in the piconet in which the sending unit is the master unit provided that the two undefined bits indicates that unit is the master unit of a piconet, i.e. for the codes "01" or "11" as defined above. The number of slave units in the piconet cam be encoded in the AM_ADDR field as an ordinary binary number. Since this field has three bits it can encode the number of slave units in the piconet, since there can be a maximum of seven slaves. Setting the three bits to zero would mean that no information on the number of active slave units is available. Also, when the undefined bits indicate that the sending unit is not the master unit of a piconet, i.e. for the codes "00" or "10" as defined above, the three bits of the AM_ADDR field should be set to zero. This use of an all-zero AM_ADDR field provides backwards compatibility with the Bluetooth specification, since the specification of the FHS packet states that these three bits should be set to zero when the FHS packet is used as an INQUIRY RESPONSE message. The resulting combinations of the two undefined bits and the three bits of the AM_ADDR field when used in the way described in this paragraph are listed in Table 1.

TABLE 1

Use of the two undefined bits and the three bits of the AM_ADDR field for defining the status of a responding unit

| The two undefined bits | Meaning of the two undefined bits | The AM_ADDR field | Meaning of the three bits of the AM_ADDR field |
|---|---|---|---|
| 00 | The sending unit is not connected to a piconet | 000 | This combination should be used |
|  |  | 001-111 | These combinations should not be used |
| 01 | The sending unit is the master of a piconet | 000 | No information available on slave units |
|  |  | 001-111 | The number of active slave units in the piconet |
| 10 | The sending unit is a slave unit in one or more piconets | 000 | This combination should be used |
|  |  | 001-111 | These combinations should not be used |
| 11 | The sending unit is the master of one piconet and a slave in one or more piconets | 000 | No information available on slave units |
|  |  | 001-111 | The number of active slave units |

If an INQUIRY RESPONSE message is received indicating that the sending unit is a slave unit in one or more piconets, the undefined bits are coded "10". It would then be useful if the BD_ADDR of the master unit of the responding piconet of the unit could be retrieved. Similarly retrieved addresses BD_ADDRs of multiple master units would be useful if the responding unit is connected to more than one piconet. A retrieved BD_ADDR of a master unit could be used to page the master unit, preferably using the modified PAGE procedure according to the description below, according to which the paging unit is allowed to join an existing piconet without performing a master-slave switch. Since there are not enough available bits to code an address BD_ADDR in the FHS packet, another method must to be used to retrieve the address.

It should be pointed out that coding the information by the two undefined bits in the FHS message, in the class of device field, or by the three bits of the AM_ADDR field in the FHS packet is not the only possible method. Useful information which may be encoded, in an FHS packet or in a modified PAGE RESPONSE message as described below, includes information about:

(1) whether the sending unit is connected to a piconet or not,
(2) whether the sending unit is a master or a slave or slaves or both,
(3) whether the sending unit prefers to be a master or a slave unit after a subsequent PAGE procedure,
(4) the number of slaves in a piconet,
(5) the BD_ADDR(s) of the master(s) of the existing piconet(s) in which the sending unit is a slave member,
(6) the clock values, as estimated by the sending unit, of the master unit(s) of the existing piconet(s) in which the sending unit is a slave member,
(7) inter-piconet scheduling parameters,
(8) battery status,
(9) traffic parameters, and/or
(10) priority parameters.

The inquiring unit or units can use this information when making the decision as to the units to which it should try to establish connections.

If the numbers of available bits in the FHS packet is not enough to encode the information to be transferred, another method has to be used. One possibility is to use a modified PAGE procedure, in which the paging unit indicates in the PAGE message that the intention of the paging procedure is not to establish a connection, but to retrieve useful information, as outlined above. Such information could, e.g. be one or multiple master unit BD_ADDR(s) of the master unit(s) of the piconet(s) to which the paged unit is connected as a slave unit. The paged unit would then respond by transmitting a new type of PAGE RESPONSE message, or by transmitting with the regular one, i.e. a packet consisting of only the Device Access Code of the responding unit, including the requested amended information. e.g. BD_ADDR(s) in this example. In the case of master BD_ADDR(s) being requested, the response message could possibly include the current clock value of the master unit, or of each of the master units if multiple master units are indicated, as estimated by the responding slave unit, to facilitate the subsequent paging of a master unit. The indication in the modified PAGE message could be e.g. a single bit extension indicating that all available information is requested or a multiple bit extension indicating the request of relevant subsets of the available information.

Another method for a unit to discover master units of already existing piconets in the vicinity of the considered unit would be to introduce a new Dedicated Inquiry Access Code (DIAC). Only units that are master units would respond to an INQUIRY message including such a "master DIAC". A unit that is not a master unit would discard the INQUIRY message. The information or indication signifying "intended-only-for-master-units" could also be an extension or modification of the Inquiry Access Codes (IACs). Then all the IACs, the General Inquiry Access Code (GIAC) as well as the Dedicated Inquiry Access Codes (DIACs), could carry an additional indication that the INQUIRY message is intended only for master units. A DIAC carrying this indication would be intended for all master units, whereas a DIAC carrying the indication would be intended for the master units of the unit type for which the DIAC is dedicated. This method of using modified Inquiry Access Codes in the INQUIRY message may be combined with the other methods described above.

The above described method involving a modified DIAC could be extended to include the use of new DIACs, as DIACs of their own or, as described above, as extensions or modifications to existing DIACs and the existing GIAC. Such other new DIACs—or DIAC/GIAC extersions/modifications—could be DIACs dedicated for units having a certain status. A unit having his certain status could be e.g.:

- a unit being a slave unit in only one piconet,
- a unit being a slave unit in at least one piconet,
- a unit being a slave unit in more than one piconet,
- a unit being a slave unit in one or more piconets, but no master unit in none,
- a unit being a slave unit in one or more piconets and a master unit in one piconet,
- a unit being a master unit in one piconet, but not a slave unit in none,
- a unit that is not connected to any piconet,
- a unit having a low current traffic load,
- a unit having a high current traffic load.

This list is of course not exhaustive, since other types of status could be associated with new DIACs—or DIAC/GIAC extensions/modifications. Only units that have the particular status indicated by a certain DIAC—or GIAC extension/modification—would respond to an INQUIRY message including this DIAC—or GIAC extension/modification. Alternatively, if the particular status is indicated by an extension to or modification of an existing DIAC, only the units of the type indicated by the DIAC, which also have the status indicated by the extension or modification, would respond to an INQUIRY message carrying this extended of modified DIAC.

The preferred alternative is to use the four combinations of the two undefined bits of the FHS packet to convey information about the sending of the status of the unit in existing piconets, possibly combined with the method using the new "master DIAC".

Once the considered unit has discovered the masters in neighbouring piconets as outlined above it may want to connect to a master as a slave without the problems associated with the master-slave switch mechanism.

Using the procedure as outlined above an approaching unit can discover a master unit of an already existing piconet. The master unit is discovered when an INQUIRY RESPONSE message, indicating that the responding unit is a master unit, using a new indication in the FHS packet or simply by responding to an INQUIRY message dedicated for master units, is received, possibly along with a number of INQUIRY RESPONSE messages from slave units. The BD_ADDR of a master unit can also have been retrieved from a slave unit in the same piconet using the modified PAGE procedure.

When a unit has discovered a master unit of an already existing piconet, the unit may want to connect to this master unit as a slave. If the discovered master unit has indicated that it prefers to be a slave unit after a subsequent PAGE procedure, provided that this type of indication, as previously outlined, is used, the considered unit may choose to:

(1) continue to try to connect to the master unit as a slave unit,
(2) try to connect to the master unit as a master unit, thereby not joining the piconet of the discovered master unit, but making the discovered master unit a slave unit in a piconet in which the considered unit is the master unit, or
(3) refrain from paging the discovered master unit. To be able to do this without performing a master-slave switch a new mechanism is required. For his purpose the following modified PAGE procedures can be used.

Like the normal PAGE procedure according to the Bluetooth specification the modified PAGE procedure begins with transmitting a PAGE message, consisting of only the DAC of the paged unit, and is followed by an identical response package received from the paged unit. The difference compared to the method according to the Bluetooth specification is that in the subsequent FHS packet from the paging unit an indication is included, indicating that the paging unit actually wants to be paged by the currently paged unit. One of the two undefined bits in the FHS packet could be used for this indication. A special use of these bits in the neighbour discovery procedure has been described above and thus they can here be used for another purpose.

Preferably, to provide backwards compatibility with the Bluetooth specification which states that the two undefined bits should be set to zero, the bit should be set to one when indicating that a reversed paging direction is requested. The three bits of the AM_ADDR in an FHS packet indicating a request of reversed paging direction should be set to zero. Actually, an alternative way to include the indication would be to simply let the all-zero AM_ADDR indicate a request of reversed paging direction when the FHS packet is used in the PAGE procedure. The two undefined bits would then still be undefined or could be used to code the same piconet related information as described above in the neighbour discovery procedure.

When a request for a reversed paging direction is received by a unit being paged, there are two alternative ways to handle the reversal of the paging direction:

(1) the current PAGE procedure is terminated, immediately followed by a new one initiated by the previously paged unit, or
(2) the paging direction is immediately reversed, without any termination of procedure, by making the unit receiving the request for reversed paging direction send an FHS packet, with all parameters set as if the sender is the paging unit, to the unit sending the request. In the former case the new PAGE procedure, in the reversed direction, proceeds just as a regular PAGE procedure. In the latter case the unit receiving the second FHS packet, i.e. the unit requesting the reversal of the paging direction, responds by sending a packet including only the DAC of the unit, i.e. just as the final message of the regular PAGE procedure, thereby concluding the reversed PAGE procedure.

If the initially paged unit in the above two cases does not accept a reversal of the paging direction, e.g. because it already is a master unit and can not accept any more slave units in its piconet, this is indicated to the paging unit by responding to the FHS packet by transmitting a second FHS packet including the same indication of request for reversal of the paging direction, i.e. with the relevant, previously undefined, bit set or with the AM_ADDR field set to all zeros or both. The unit receiving this indication that the reversal of the paging direction is not accepted. i.e. the unit that initiated the PAGE procedure, can then choose to either proceed with the PAGE procedure without reversing the direction or to abandon the PAGE procedure. If it chooses to proceed, this can be done in two alternative ways:

(1) by restarting the PAGE procedure by sending a new initial PAGE message, or
(2) by sending a third FHS message, in the initial direction, this time without the indication of request for reversal of the paging direction.

An alternative procedure for reversal of the paging direction could be to make the initial PAGE message carry the indication of the request for reversal of paging direction. Since the reversal of the paging direction requires that the BD_ADDR or the DAC of the is unit initiating the PAGE procedure be transferred to the initially paged unit, it is preferable that the indication consists of the BD_ADDR or the DAC of the sending unit. In this alternative the actual reversal of the paging direction could be performed either by terminating the PAGE procedure after the first modified PAGE message, immediately followed by a new PAGE procedure initiated by the previously paged unit, or the paging direction could be immediately reversed, without termination, by letting the unit receiving the request for reversed paging direction send an FHS packet, having all parameters set as if the sender is the paging unit, to the unit sending the request. In both cases, the respective procedure proceeds as a regular PAGE procedure.

The procedures described in this section may be used even if the paged unit is not a master unit. There may be reasons for the paging unit to become a slave of the new piconet that will be formed.

The preferred procedure is to indicate the request for reversal of the paging direction using one of the undefined bits in the FHS packet and immediately thereafter to reverse the paging direction by making the receiver of the first FHS packet return another FHS packet and to then proceed as in a normal PAGE procedure.

The procedures described above are not limited to units adapted to communicate according to the Bluetooth specification and can be used for units adapted to communicate with each other using a method having some properties similar to that defined by the Bluetooth specification.

Generally, such units are adapted to form distinct, albeit dynamic, ad hoc networks and they use a neighbour discovery procedure in establishing such networks. Information of the status of the units connected in an already existing ad hoc network is transferred in the neighbour discovery procedure, as described above. Also other useful unit or network related information can be transferred, e.g. the number of units in the existing ad hoc network, addresses of other units in the ad hoc network, clock values of the unit itself and/or of other units in the ad hoc network, scheduling parameters, battery status, traffic parameters, priority parameters, etc. Such received information can then be used in the unit which tries to connect to ad hod networks when deciding which ad hoc network(s) to join, how to join it/them and whether to establish and with which other units to establish a new or several new ad hoc networks. The received information could also be used to facilitate reforming of existing ad hoc network structures.

When establishing an ad hoc network, if the initiator of the establishment automatically gets a certain specific role in the ad hoc network, e.g. a master or slave role, a procedure can be provided, as described above, to make the initiating unit request from another unit that it takes over the role of initiator. This procedure is signalled either by a new parameter in an existing message used in the establishment phase or by a new message.

Figure 7:
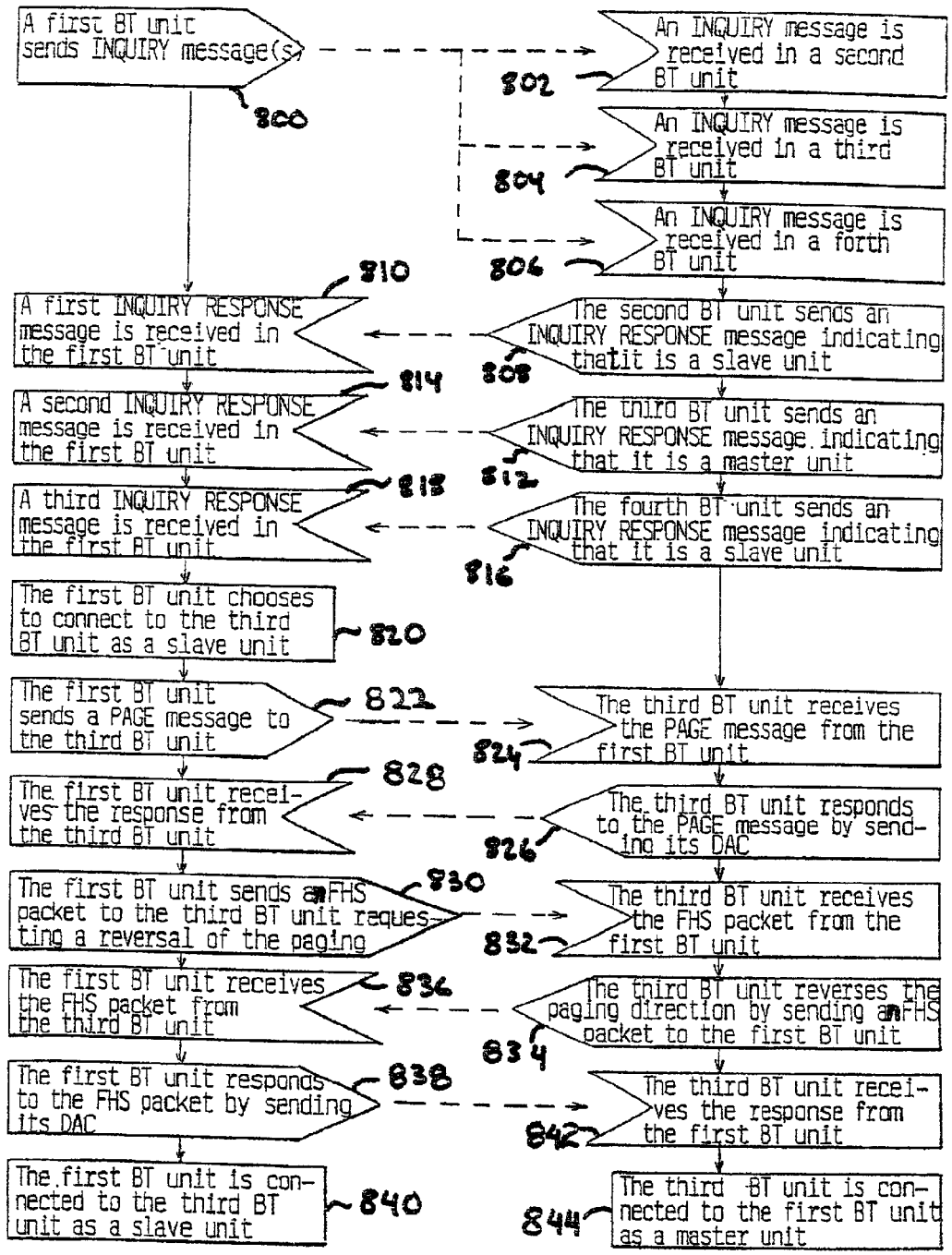
FIG. 7 is a flow diagram illustrating the steps executed in procedures executed when a unit tries to contact other units and then connects to another unit.

In FIG. 7 a flow diagram is shown illustrating the steps executed when a first unit tries to establish contact with other units in a neighbour discovery procedure and connects to another unit in a network forming procedure as described above, the steps being executed primarily for units adapted to communicate according to the Bluetooth specification. In the left column the steps executed by the first unit are illustrated and in the right column the steps executed by other units are illustrated. The procedure starts in a block 800 where the first unit sends an INQUIRY message or several such messages. Any other unit in the vicinity of the first unit can receive such a message. In the example shown an INQUIRY message is received by a second unit in a block 802, by a third unit in a block 804 and by a fourth unit in a block 806. Each unit that has received an INQUIRY message replies by sending an INQUIRY RESPONSE message. In the block 808 the second unit sends an INQUIRY RESPONSE message back to the first unit indicating that it is a slave unit in an already formed piconet and then in a block 810 this first INQUIRY RESPONSE message is received by the first unit which detects the state of the sender of the message. In a block 812 the third unit sends an INQUIRY RESPONSE message back to the first unit and in the message is indicated that the sender of the message is a master of an already formed piconet and then in a block 814 this second INQUIRY RESPONSE message is received by the first unit which decodes the state information of the sending unit. In a block 816 the fourth unit sends an INQUIRY RESPONSE message back to the first unit, the message having additional information telling that the unit sending the message is a slave in an already formed piconet and then in a block 818 the third INQUIRY RESPONSE message is received by the first unit which decodes the additional information.

Out of the second, third and fourth responding units only the third unit indicated that it was a master unit in some piconet. Then in a block 820 the first unit chooses to connect to the third unit as a slave unit in the piconet in which the third unit is the master.

In order for the first unit to be able to connect to the third unit as a slave without using the master-slave switch the procedure continues as follows: In a block 822 the first unit sends a PAGE message to the third unit. Thereafter in a block 824 the third unit receives the PAGE message from the first unit. In a block 826 the third unit responds to the PAGE message by sending its Device Access Code (DAC). Then in the next block 828 the first unit receives the response from the third unit. In a block 830 the first unit sends an FHS packet to the third unit requesting a reversal of the paging direction. Then in the next block 832 the third unit receives the FHS packet from the first unit. In a block 834 the third unit reverses the paging direction by sending an FHS packet to the first unit. Then in the next block 836 the first unit receives the FHS packet from the third unit. In a block 838 the first unit responds to the FHS packet by sending its DAC. The third unit receives in a block 842 the response from the first unit. Then in the blocks 840 and 844 following the blocks 838 and 842 respectively the first unit becomes connected to the third unit as a slave unit and the third unit becomes connected to the first unit as a master unit.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein, Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method for connecting a first unit to an ad hoc network comprising at least two units having different roles, the units being adapted to communicate according to the Bluetooth specification, the ad hoc network comprising at least one piconet formed according to the Bluetooth specification, the roles of the units in the ad hoc network comprising master and slave, the method comprising the steps of:

the first unit establishing contact with at least one of the units of the ad hoc network and said at least one unit, in the establishment of contact, sending information to the first unit, the information including an indication of the role of said at least one unit in the ad hoc network;

the first unit thereafter, based on said information, connecting to said at least one unit, the first unit thereby becoming connected to the ad hoc network;

wherein the step of establishing contact, the first unit sends at least one INQUIRY message and said at least one unit responds by sending an INQUIRY RESPONSE message comprising a Frequency Hop Synchronization (FHS) packet, the FHS packet including information of the status of said at least one unit in the at least one piconet, the FHS packet further including information as to at least one of the following:

whether the responding unit is connected to at least one of said at least one piconet, whether the responding unit is a slave in at least one of said at least one piconet, whether the responding unit prefers to be a master or a slave after a subsequent PAGE procedure, number of slaves in at least one of said at least one piconet, the BD__ADD(s) of at least one master unit of said at least one piconet where the responding unit is a slave member, the clock value(s) of at least one master unit of said at least one piconet where the responding unit is a slave member, inter-piconet scheduling parameters at least one unit that is connected to at least two piconets, the battery status of the responding unit, traffic parameters in at least one of the piconets or priority parameters.

2. A method for connecting a first unit to an ad hoc network comprising at least two units having different roles, the units being adapted to communicate according to the Bluetooth specification, the ad hoc network comprising at least one piconet formed according to the Bluetooth specification, the roles of the units in the ad hoc network comprising master and slave, the method comprising the steps of:

the first unit establishing contact with at least one of the units of the ad hoc network and said at least one unit, in the establishment of contact, sending information to the first unit, the information including an indication of the role of said at least one unit in the ad hoc network;

the first unit thereafter, based on said information, connecting to said at least one unit, the first unit thereby becoming connected to the ad hoc network;

wherein the step of establishing contact, the first unit sends at least one INQUIRY message and said at least one unit responds by sending an INQUIRY RESPONSE message comprising a Frequency Hop Synchronization (FHS) packet, the FHS packet including information of the status of said at least one unit in the at least one piconet;

wherein the information is encoded using at least one of two undefined bits in the FHS packet.

3. A method according to claim 2, wherein one of said at least two undefined bits encodes whether the responding unit is a master of a piconet.

4. A method according to claim 2, wherein one of said at least two undefined bits encodes whether the responding unit is a slave in at least one piconet.

5. A method for connecting a first unit to an ad hoc network comprising at least two units having different roles, the units being adapted to communicate according to the Bluetooth specification, the ad hoc network comprising at least one piconet formed according to the Bluetooth specification, the roles of the units in the ad hoc network comprising master and slave, the method comprising the steps of:

the first unit establishing contact with at least one of the units of the ad hoc network and said at least one unit, in the establishment of contact, sending information to the first unit, the information including an indication of the role of said at least one unit in the ad hoc network;

the first unit thereafter, based on said information, connecting to said at least one unit, the first unit thereby becoming connected to the ad hoc network;

wherein the step of establishing contact, the first unit sends at least one INQUIRY message and said at least one unit responds by sending an INQUIRY RESPONSE message comprising a Frequency Hop Synchronization (FHS) packet, the FHS packet including information of the status of said at least one unit in the at least one piconet;

wherein the information is encoded using the class of device field in the FHS packet.

6. A method for connecting a first unit to an ad hoc network comprising at least two units having different roles, the units being adapted to communicate according to the Bluetooth specification, the ad hoc network comprising at least one piconet formed according to the Bluetooth specification, the roles of the units in the ad hoc network comprising master and slave, the method comprising the steps of:

the first unit establishing contact with at least one of the units of the ad hoc network and said at least one unit, in the establishment of contact, sending information to the first unit, the information including an indication of the role of said at least one unit in the ad hoc network;

the first thereafter, based on said information, connecting to said at least one unit, the first unit thereby becoming connected to the ad hoc network;

wherein the step of establishing contact, the first unit sends at least one INQUIRY message and said at least one unit responds by sending and INQUIRY RESPONSE message comprising a Frequency Hop Synchronization (FHS) packet, the FHS packet including information of the status of said at least one unit in the at least one piconet;

wherein the information is encoded using an AM__ADDR field in the FHS packet.

7. A method according to claim 6, wherein the AM__ADDR field is used to encode whether the responding unit, when subsequently paged, will want to connect to the paging unit as a slave or a master.

8. A method for connecting a first unit to an ad hoc network comprising at least two units having different roles, the units being adapted to communicate according to the Bluetooth specification, the ad hoc network comprising at least one piconet formed according to the Bluetooth specification, the roles of the units in the ad hoc network comprising master and slave, the method comprising the steps of:

the first unit establishing contact with at least one of the units of the ad hoc network and said at least one unit, in the establishment of contact, sending information to a first unit, the information including an indication of the role of said at least one unit in the ad hoc network;

the first thereafter, based on said information, connecting to said at least one unit, the first unit thereby becoming connected to the ad hoc network;

wherein the step of establishing contact, the first unit sends at least one INQUIRY message and said at least one unit responds by sending an INQUIRY RESPONSE message comprising a Frequency Hop Synchronization (FHS) packet, the FHS packet including information of the status of said at least one unit in the at least one piconet;

wherein the information is encoded using a combination of the undefined bits, a class of device field, and an AM_ADDR field in the FHS packet.

9. A method according to claim 8, wherein the AM_ADDR is used to encode the number of active slave units in the piconet for which responding unit is a master.

10. A method for connecting a first unit to an ad hoc network comprising at least two units having different roles, the units being adapted to communicate according to the Bluetooth specification, the ad hoc network comprising at least one piconet formed according to the Bluetooth specification, the roles of the units in the ad hoc network comprising master and slave, the method comprising the steps of:

the first unit establishing contact with at least one of the units of the ad hoc network and said at least one unit, in the establishment of contact, sending information to the first unit, the information including an indication of the role of said at least one unit in the ad hoc network;

the first unit thereafter, based on said information, connecting to said at least one unit, the first unit thereby becoming connected to the ad hoc network;

wherein the step of establishing contact, the first unit sends at least one INQUIRY message and said at least one unit responds by sending an INQUIRY RESPONSE message comprising a Frequency Hop Synchronization (FHS) packet, the FHS packet including information of the status of said at least one unit in the at least one piconet;

wherein the responding unit is a slave in a piconet; and, wherein the first unit sends a PAGE to the slave indicating the first unit intent to retrieve the at least one address (BD_ADDR) for the at least one master for the slave and the slave sending a PAGE RESPONSE message containing the requested at least one BD_ADDR.

11. A method according to claim 10, wherein the PAGE RESPONSE includes at least one current clock value of said at least one master units of the responding unit.

12. A method according to claim 10, wherein the PAGE RESPONSE further includes information as to at least one of the following: whether the responding unit is connected to at least one of said at least one piconet, whether the responding unit is a slave in at least one of said at least one piconet, whether the responding unit prefers to be a master or a slave after a subsequent PAGE procedure, the number of slaves in at least one of said at least one piconet, the BD_ADDR(s) of at least one master unit of said at least one piconet where the responding unit is a slave member, the clock value(s) of at least one master unit of said at least one piconet where the responding unit is a slave member, inter-piconet scheduling parameters of at least one Bluetooth that is connected to at least two piconets, the battery status of responding unit, traffic parameters in at least one of the piconets or priority parameters.

13. A method for connecting a first unit to an ad hoc network comprising at least two units having different roles, the units being adapted to communicate according to the Bluetooth specification, the ad hoc network comprising at least one piconet formed according to the Bluetooth specification, the roles of the units in the ad hoc network comprising master and slave, the method comprising the steps of:

the first unit establishing contact with at least one of the units of the ad hoc network and said at least one unit, in the establishment of contact, sending information to the first unit, the information including an indication of the role of said at least one unit in the ad hoc network;

the first unit thereafter, based on said information, connecting to said at least one unit, the first unit thereby becoming connected to the ad hoc network;

wherein the step of establishing contact, the first unit sends at least one INQUIRY message and said at least one unit responds by sending an INQUIRY RESPONSE message comprising a Frequency Hop Synchronization (FHS) packet, the FHS packet including information of the status of said at least one unit in the at least one piconet;

wherein the INQUIRY message contains a Dedicated Inquiry Access Code which is dedicated to, and will only be responded to, by one of the following:

a unit being a slave unit in one and only one piconet, a unit being a slave unit in at least one piconet, a unit being a slave unit in more than one piconet, a unit being a slave unit in one or more piconets, but a master unit in none, a unit being a slave unit in one or more piconets and a master unit in one piconet, a unit being a master unit in one piconet, but a slave unit in none, a unit that is not connected to any piconet, a unit with low current traffic load, or a unit with high current traffic load.

14. A method according to claim 13, wherein the INQUIRY message contains a Dedicated Inquiry Access Code (DIAC) which is only responded to by master units.

15. A method for connecting a first unit to an ad hoc network comprising at least two units having different roles, the units being adapted to communicate according to the Bluetooth specification, the ad hoc network comprising at least one piconet formed according to the Bluetooth specification, the roles of the units in the ad hoc network comprising master and slave, the method comprising the steps of:

the first unit establishing contact with at least one of the units of the ad hoc network and said at least one unit, in the establishment of contact, sending information to the first unit, the information including an indication of the role of said at least one unit in the ad hoc network;

the first unit thereafter, based on said information, connecting to said at least one unit, the first unit thereby becoming connected to the ad hoc network;

wherein in the establishment of contact, the first unit sends at least one INQUIRY message and said at least one unit responds by sending an INQUIRY RESPONSE message comprising a Frequency Hop Synchronization packet, the INQUIRY message containing Dedicated Inquiry Access Code which is only responded to by units having the role of master.

16. A method for connecting a first unit to an ad hoc network comprising at least two units having different roles, the units being adapted to communicate according to the Bluetooth specification, the ad hoc network comprising at least one piconet formed according to the Bluetooth specification, the roles of the units in the ad hoc network comprising master and slave, the method comprising the steps of:

the first unit establishing contact with at least one of the units of the ad hoc network and said at least one unit, in the establishment of contact, sending information to the first unit, the information including an indication of the role of said at least one unit in the ad hoc network;

the first unit thereafter, based on said information, connecting to said at least one unit, the first unit thereby becoming connected to the ad hoc network;

wherein in the establishment of contact, the first unit sends at least one INQUIRY message and said at least one unit responds by sending an INQUIRY RESPONSE message comprising a Frequency Hop Synchronisation packet, the INQUIRY message containing a Dedicated Inquiry Access Code (DIAC) which is dedicated to, and is only be responded to, by one of the following:

a unit being a slave unit in one and only one piconet, a unit being a slave unit in at least one piconet, a unit being a slave unit in more than one piconet, a unit being a slave unit in one or more piconets, but a master unit in none, a unit being a slave unit in one or more piconets and a master unit in one piconet, a unit being a master unit in one piconet, but a slave unit in none, a unit that is not connected to any piconet, a unit with low current traffic load, or a unit with high current traffic load.

17. A method according to claim 16, wherein the INQUIRY message contains a Dedicated Inquiry Access Code (DIAC) which is only responded to by master units.

18. A method for connecting a first unit to an ad hoc network comprising at least two units, the at least two units having different roles, the units being adapted to communicate according to the Bluetooth specification, the ad hoc network comprising at least one piconet formed according to the Bluetooth specification, the roles of the units in the ad hoc network comprising master and slave and said at least one unit having the role of master, the method comprising the steps of:

the first unit establishing contact with at least one of the units of the ad hoc network;

the first unit thereafter connecting to said at least one unit, the first unit thereby becoming connected to the ad hoc network;

wherein in the step of connecting, the first unit chooses or determines the roles of itself and of said at least one unit in the ad hoc network formed after the first unit becoming connected;

wherein in the step of connecting, a PAGE message is sent from the first unit to said at least one unit, thereafter a PAGE RESPONSE message is sent from said at least one unit to first unit, and finally a Frequency Hop Synchronization (FHS) packet is sent from the first unit to said at least one unit, the FHS packet including an indication that the first unit has determined to reverse the paging direction from said at least one unit to the first unit.

19. A method according to claim 18, wherein the reversal is performed by terminating the current PAGE procedure and initiating a new PAGE procedure from the master to the first unit.

20. A method according to claim 18, wherein the reversal is performed by the master Bluetooth which receives the request for reversal sending an FHS packet to the first unit with all FHS parameters set as if the sender is the paging unit and the first unit responding with a packet including only the first unit DAC, thereby concluding the reversed page procedure.

21. A method according to claim 18 wherein the paged unit does not accept the reversal of paging direction, and wherein the paged unit responding to the FHS packet with a second FHS packet including the same indication request for reversal of paging direction and the first unit receiving this second FHS packet choosing to either proceed with the PAGE procedure without reversing abandoning the PAGE procedure.

22. A method according to claim 21, wherein if the first unit chooses to proceed with the PAGE procedure it proceeds by restarting the PAGE procedure by sending a new initial PAGE message.

23. A method according to claim 21, wherein if the first unit chooses to proceed with the PAGE procedure it proceeds by sending a third FHS message without an indication of request for reversal of paging direction.

24. A computer program product directly loadable into the internal of a digital computer, comprising software code portions for performing the steps of the methods of or the methods performed by any block or device according to claim 1 when the product is run on a computer.

25. A computer program product stored on a computer usable medium, comprising readable program means for causing a computer to control the execution of the steps of the methods performed by any block or device according to claim 1.

26. A computer program product directly loadable into the internal of a digital computer, comprising software code portions for performing the steps of the methods of or the methods performed by any block or device according to claim 18 when the product is run on a computer.

27. A computer program product stored on a computer usable medium, comprising readable program means for causing a computer to control the execution of the steps of the methods performed by any block or device according to claim 18.

* * * * *

UNITED STATES PATENT AND TRADEMARK OFFICE
CERTIFICATE OF CORRECTION

PATENT NO. : 6,901,057 B2
DATED : May 31, 2005
INVENTOR(S) : Rune et al.

It is certified that error appears in the above-identified patent and that said Letters Patent is hereby corrected as shown below:

<u>Title page,</u>
Item [22], PCT Filed, should read -- December 6, 2000 --.

Signed and Sealed this

Ninth Day of May, 2006

JON W. DUDAS
*Director of the United States Patent and Trademark Office*